United States Patent [19]

Noziri et al.

[11] 3,931,131

[45] Jan. 6, 1976

[54] PROCESS AND APPARATUS FOR SUSPENSION POLYMERIZATION

[75] Inventors: Hiroyuki Noziri; Mituaki Sugahara; Hirotada Tanno, all of Iwaki, Japan

[73] Assignee: Kureha Kagaku Kogyo Kabushiki Kaisha, Tokyo, Japan

[22] Filed: Dec. 13, 1974

[21] Appl. No.: 532,638

[30] Foreign Application Priority Data
Dec. 18, 1973 Japan............................ 48-140369
Mar. 13, 1974 Japan............................ 49-28022

[52] U.S. Cl........... 260/91.7; 260/92.1; 260/92.8 W
[51] Int. Cl.²...................... C08F 2/18; C08F 14/00
[58] Field of Search............. 260/91.7, 92.1, 92.8 W

[56] References Cited
UNITED STATES PATENTS

| | | | |
|---|---|---|---|
| 2,838,380 | 6/1958 | Kean................................ | 260/92.1 |
| 3,488,328 | 1/1970 | Koyanagi et al.............. | 260/92.8 W |
| 3,515,709 | 6/1970 | Nelson et al...................... | 260/91.7 |
| 3,842,055 | 10/1974 | Gabriel et al.................. | 260/92.8 W |
| 3,849,179 | 11/1974 | Morningstar................... | 260/92.8 W |
| 3,882,195 | 5/1975 | Daniels et al.................. | 260/92.8 W |
| B415,124 | 1/1975 | Burgess et al.................. | 260/92.8 W |

*Primary Examiner*—Alan Holler
*Attorney, Agent, or Firm*—Wenderoth, Lind & Ponack

[57] ABSTRACT

In a suspension polymerization process which comprises polymerizing an ethylene halide by itself or a mixture of an ethylene halide and a monomer copolymerizable therewith in an aqueous medium in the presence of a suspending agent and an oil-soluble catalyst under pressure, a pressure polymerization vessel the internal exposed surfaces of which are wholly or at least partially lined with wood is used so as to prevent adhesion of the resulting polymer to the exposed area.

4 Claims, 3 Drawing Figures

PROCESS AND APPARATUS FOR SUSPENSION POLYMERIZATION

BACKGROUND OF THE INVENTION

The present invention relates to a suspension polymerization process in which an ethylene halide or a mixture of an ethylene halide and a monomer copolymerizable therewith is continuously suspension polymerized while adherence of the polymerization component to the wall of the polymerization apparatus is prevented and to a polymerization apparatus therefor.

That is, as is well known, in the suspension polymerization of at least one monomer selected from ethylene halides including vinyl chloride, vinyl fluoride, vinylidene chloride, vinylidene fluoride, tetrafluoroethylene, or mixtures thereof or mixtures of an ethylene halide and a monomer copolymerizable therewith in an aqueous medium in the presence of an oil-soluble catalyst and a suspending agent, the resulting polymer adheres to the inner wall of the polymerizatiton vessel and to the internal accessory devices such as agitating vanes, baffle plates, a temperature detector, and the like. This adhesion of the polymer reduces the yield of the polymer and a polymerization temperature adjusting ability and gives rise to problems such as difficulty in adjusting the polymerization temperature and mixing of the adhering material into the product thereby to cause deterioration of the physical properties of the product.

Further, there is caused another problem from the standpoint of operation of a polymerization vessel in that removal of the adhering material requires an excessive amount of labor and time, reducing the rate of production. In addition, occurrence and growth of the adhering material is a great obstacle to continuation of the suspension polymerization operation.

That is, in order to insure good quality of the product produced by a continuous suspension polymerization process, it is necessary to use a so-called multi-vessel type reactor so as to reduce reverse mixing as much as possible. For this purpose, a passage of a very small area must be formed at least between adjacent vessels, which in turn gives rise to the problem of plugging, whereby normal operation is hindered.

It is known that the occurrence of the sticking material depends upon the material from which the polymerization vessel used is made and the content contained in the polymerization vessel. In general, with a polymerization vessel made of stainless steel severe sticking occurs. In the case of a polymerization vessel lined with glass, the degree of sticking is slightly reduced, but when this type of vessel is used, the polymerization vessel must be cleaned after every polymerization operation and, thus, operated by a batch operation. It is not suitable for a continuous operation. Although various attempts have been long made to prevent such sticking, a satisfactory method is still to be found, and this lack is a great obstacle to the continuous operation of the suspension polymerization described above.

It is considered that the adhesion of a polymer to the inner wall of the polymerization vessel in the suspension polymerization process is caused by the monomer being first adsorbed on the inner wall and then being polymerized on the surface.

In view of this consideration, as one measure for preventing adhesion in the suspension polymerization of the ethylene halide in an aqueous medium, coating of various materials capable of adsorbing water and forming a film of water on the inner wall of the polymerization vessel has been heretofore practiced. However, in all cases, the film of water formed on the surface is composed of a monomolecular layer or at most 20 layers, and this film may be easily removed depending on change in the conditions surrounding the film, whereby it is thus impossible to maintain the film for a long period of time. Therefore, it is possible to attain temporary adhesion prevention using the prior art, but it is almost impossible to expect a continuous effect.

SUMMARY OF THE INVENTION

It is an object of the present invention to solve the above-mentioned problems of the prior art and to provide a process for the continuous suspension polymerization of the ethylene halides mentioned above and an apparatus therefor.

That is, in the suspension polymerization of at least one monomer selected from ethylene halides including vinyl chloride, vinyl fluoride, vinylidene chloride, vinylidene fluoride, tetrafluoroethylene, or mixtures thereof or mixtures of an ethylene halide and a monomer copolymerizable therewith in an aqueous medium containing an oil-soluble catalyst and a suspending agent, polymerization under pressure is carried out in a pressure polymerization vessel in which the whole or at least adhesion susceptive surfaces of the inner wall and accessory instruments contained therein are lined with wood or are constructed of wood. As to the ability of wood to prevent adhesion in the process of the present invention, it is considered that because of its tendency to adsorb water, the wood forms a film of water on the surface thereof which acts as a barrier to a sticking polymer.

The wood used in the process of the present invention adsorbs water within the interior thereof and forms a film of water. As compared with the prior method in which a film of water is formed on the inner wall of the polymerization vessel merely using a thin coating of a wettable material, the process of the present invention provides a film of water which is thicker and not easily removed, and, accordingly, adhesion is effectively prevented. Moreover, this effect lasts for a long time.

DETAILED DESCRIPTION

Figure 1:
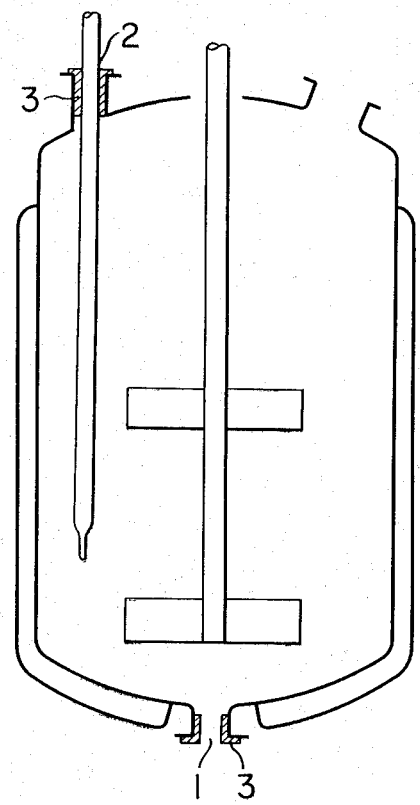
FIG. 1 is an elevation, in vertical section, of a polymerization vessel to the inner wall surface of which wood is partially attached.

In accordance with the process of the present invention, for example, as is shown in FIG. 1, wood 3 is attached to a part subject to adhesion of a polymer in a polymerization vessel, particularly to the inner wall surface of a side pipe nozzle such as an outlet 1 of a product and a baffle fitting part 2 by inserting the wood formed to fit the nozzle in the inner wall of the nozzle. Further, wood is bonded onto parts subject to adhesion such as a baffle, an agitator and the like or the portion in which a glass lining is broken in a glass lined vessel by means of a suitable adhesive in order to prevent adhesion of polymer. Wood having a thickness of at least 0.1 mm, and preferably at least 1 mm, is satisfactory.

If the wood is attached to the entire inner exposed surfaces of a suspension polymerization apparatus, a more effective result can be obtained. However, in this case, because the wood is lower in heat conductivity than a metallic material or glass conventionally used, it is very difficult to remove heat from the inner wall of the polymerization vessel. As a countermeasure to this problem, it is desirable to remove heat by a cooling coil provided in the interior of the polymerization vessel. Even by this method, it is expected that a polymer will adhere to the surface of the coil thereby to reduce the heat transfer effect thereof in a short period of time. In such a case, however, it is possible to remarkably reduce the rate of polymerization on the surface of the coil and to prevent the adhesion of the polymer thereto by controlling the surface temperature of the coil.

That is, if the surface of the coil is maintained at a temperature lower than the polymerization temperature, the rate of polymerization on the surface is reduced, whereby the adhesion of the polymer is prevented. This surface temperature can be determined on the basis of the decomposition temperature of a catalyst or a half-period.

Since the rate of a radical polymerization is reduced approximately by half, in general, when the polymerization temperature is reduced by 10°C, the rate of polymerization on the surface of the coil becomes about 1/16 if the surface temperature of the coil is about 40°C lower than that of the polymerization temperature. Accordingly, if the surface temperature of the coil is maintained at a lower level, little precipitation of the polymer on the surface of the coil is observed.

On the other hand, when considering the area of heat transfer, it is possible to reduce it remarkably as compared with areas conventionally used by lowering the temperature of the refrigerant in the coil without damaging the function of the polymerization vessel. Unlike a jacket, the coil has an advantage in that the area of heat transfer may be changed as desired. It was also found that the design of the coil per se could be changed so as to improve the stirring effect.

Almost any kind of wood is capable of exhibiting a satisfactory effect of adhesion prevention in the process of the present invention. Preferably, however, the wood for use in the present invention is dense, has a high specific gravity in an air-dried state, and has high mechanical strength. For example, the specific gravity is preferably at least 0.65. Examples of such woods include red oak, white oak, *Quercus crispula Blume*, maple, lignumvitae.

As a rule, in considering wood as a material for an apparatus, the mechanical strength of wood is not significantly high. Therefore, instead of making the polymerization vessel of the wood alone, the polymerization vessel may be simply made by using the wood as a thin film lining on the inner wall of a pressure vessel such as a conventional steel clad or glass-lined vessel or shaping the wood per se.

This simplification of fabrication and repair cannot be achieved by any other industrial material which may be used in the above-mentioned suspension polymerization process.

In accordance with the present invention, it is possible to effect continuous polymerization because of the absence of polymer adherence. For example, referring to FIG. 2, there is shown a single polymerization vessel containing a plurality of compartments. Also, FIG. 3 shows a plurality of polymerization vessels connected to each other by means of pipes 18 lined with wood. In these cases, the number of the polymerization vessels or the compartments is determined by the quality of the polymer product.

Further, since adhesion in the polymerization reaction tends to occur during a period in which the polymerization reaction starts and reaches a polymer yield of 30 to 50%, it is possible to use a conventional polymerization vessel in the latter half of the polymerization.

The continuous polymerization process according to the present invention will be further described with reference to FIG. 2. In the apparatus shown in FIG. 2, a single polymerization vessel is provided with a plurality of compartments therewithin, and the upper compartments 4 are internally lined with wood. The vessel is divided into these compartments by partition walls 5, and the divided compartments are each provided with stirring vanes 6. These members are made of wood itself or have wood lining at least on the surface thereof (the cross-hatched parts in the drawing are constructed of wood). Each compartment is further provided with a cooling coil 7.

The lower portion 8 of the vessel, which takes part in the latter half of the polymerization reaction during which there is little possibility of adhesion, comprises conventional polymerization vessels made of stainless steel or of steel lined with glass, which are equipped with cooling jackets 9 on the outside. The partition walls 5a and stirring vanes 6a in this portion may be made of stainless steel or of steel lined with glass.

In the practice of the polymerization, pure water is first poured into the polymerization vessel and a refrigerant is passed through the cooling coils. Following this, a heated solution of a suspending agent in water is charged into the vessel at the top part thereof through a pipe 10. When the solution reaches a predetermined temperature, a monomer and a catalyst are charged into the vessel at the top part thereof through a pipe 11. The heat developed as the polymerization reaction proceeds is removed by the coils 7 and jackets 9. The polymer produced falls from the top compartment to the bottom compartment while passing through interstices between a vertical stirring shaft supporting the vanes 6 and the partition wall 5 and is removed through a nozzle 12 provided at the bottom of the vessel, while an extremely small quantity of an inert gas contained in the monomer is discharged through a nozzle 13 provided at the top of the vessel at a flow rate such as to maintain the pressure within the vessel at a constant value. In FIG. 2, reference numerals 14 and 15 designate pipes for conducting a refrigerant at a low temperature, and reference numerals 16 and 17 designate pipes for conducting water at normal temperature or a refrigerant.

In accordance with the present invention ethylene halides are polymerized, or copolymerized with a monomer copolymerizable therewith. Examples of the ethylene halide include vinyl chloride, vinyl fluoride, vinylidene chloride, vinylidene fluoride, tetrafluoroethylene and mixtures thereof. Examples of the monomer copolymerizable with the ethylene halide include vinyl esters such as vinyl acetate, vinyl ethers such as methyl vinyl ether, acrylic acid, methacrylic acid, esters of acrylic acid such as methyl acrylate, esters of methacrylic acid such as methyl methacrylate, and olefins such as ethylene, propylene, and butylene.

Any conventional polymerization recipe may be used in the process of the present invention. Examples of suspending agents usable in the present invention are conventional suspending agents such as polyvinyl alcohol, partially saponified polyvinyl acetate, vinylmaleic anhydride copolymers, styrene-maleic anhydride copolymers, polyacrylic acid, gelation, and starch and cellulose derivatives such as methyl cellulose, hydroxymethyl cellulose, and carboxymethyl cellulose. Examples of polymerization catalysts usable in the present invention are oil-soluble hydroperoxides, acylperoxides, benzoylperoxide, azo compounds, for example, azobisisobutylnitrile, and radical generating catalysts such as peroxycarbonates, for example, isopropyl peroxydicarbonate.

In order to indicate more fully the nature and utility of this invention, the following specific examples of practice are set forth, it being understood that these examples are presented as illustrative only and that they are not intended to limit the scope of the invention.

EXAMPLE 1

6300 g of pure water, 3 g of partially saponified polyvinyl acetate and 3 g of lauroyl peroxide were added to a 10 l pressure polymerization vessel which was made of stainless steel and provided with a stirrer having a paddle in the upper and lower portions thereof, and which had a sheet of white oak on its inner wall surface at the interface between gas and liquid. After the atmosphere within the vessel was displaced with nitrogen, 3000 g of vinyl chloride was added to the vessel and the polymerization reaction was carried out at a rotational speed of 400 r.p.m. of the stirrer and a temperature of 58°C for 15 hours. It was observed that no scale adhesion was formed on the surface of the white oak sheet, while a coating having a thickness of 0.1 mm was formed on the surface of the stainless steel portion throughout the wall of the vessel.

Further, when the same polymerization procedure was repeated 50 times, no scale adhesion was still formed on the surface of the white oak sheet.

EXAMPLE 2

With the use of a 14 m$^3$ pressure polymerization vessel lined with glass and equipped with a stirrer having two paddle type vanes positioned on the upper and lower portions thereof, as shown in FIG. 1, in which a bush 3 made of lignumvitae was inserted into the interstice between a baffle and a nozzle and a cylinder made of lignumvitae was inserted into a nozzle for recovering the product at the bottom of the vessel, polymerization of vinyl chloride was carried out according to the polymerization procedure described in Example 1.

When the polymerization was repeated about 180 times by batch operation, no occurrence of adherence was observed, and the polymerization was carried out very smoothly.

Ordinarily, in the case where the above described measure is not adopted, only two cycles of the polymerization operation result in adhesion, and the adhering material grows into a lump which leads to a very dangerous state. In contrast, by the practice of the process of this invention, there is no possibility whatsoever of such as occurence.

EXAMPLE 3

Figure 2:
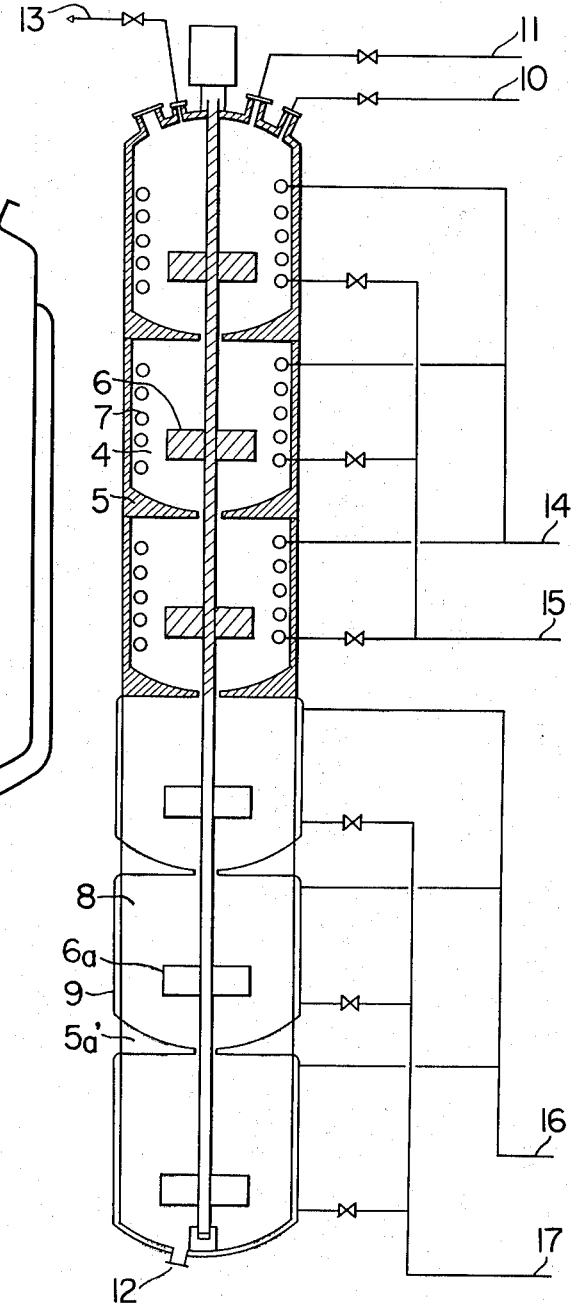
FIG. 2 is an elevation, in vertical section, of one example of a polymerization apparatus which may be used in the practice of the present invention.
Figure 3:
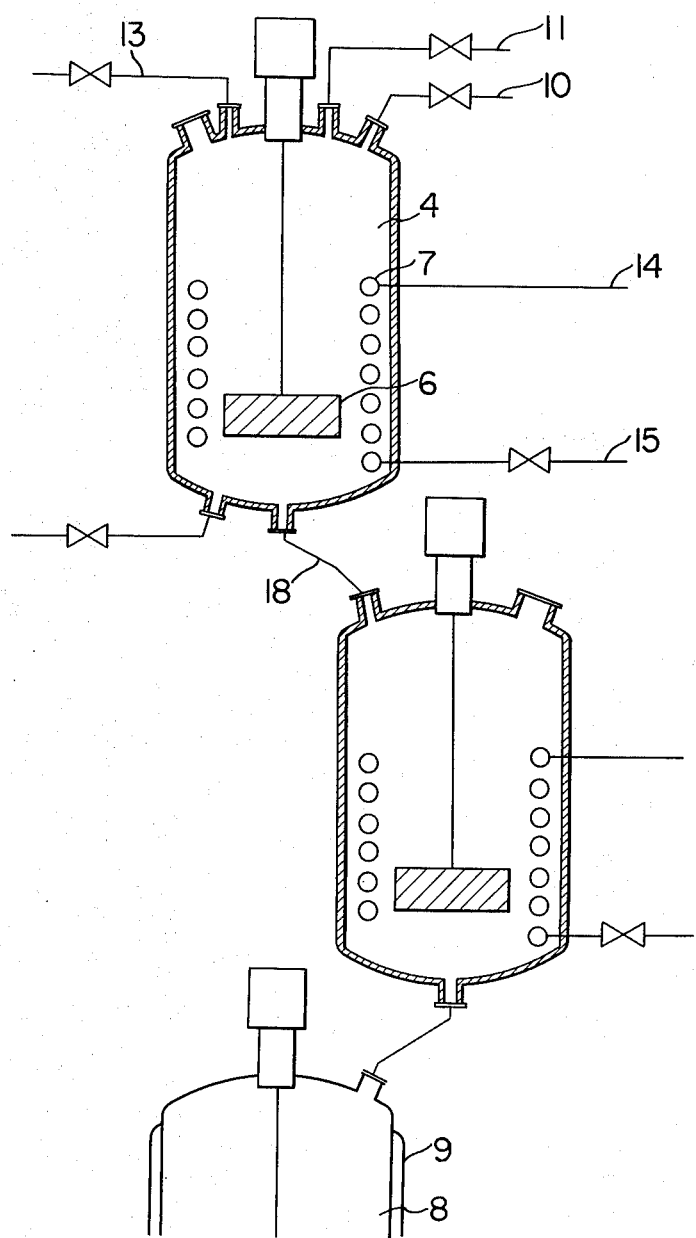
FIG. 3 is a schematic view, partly in vertical section, of another example of a polymerization apparatus which may be used in the practice of the present invention.

With the use of a polymerization vessel having a diameter of 0.5 m and a height of 3 m and including six compartments as shown in FIG. 2, continuous polymerization was carried out. 40 kg/h of an aqueous suspension containing 0.05% of partially saponified polyvinyl acetate and 20 kg/h of vinyl chloride containing 0.1% of lauroyl peroxide dissolved therein were continuously charged into the vessel, respectively. The polymerization was conducted at a temperature of 58°C, a pressure of 9.7 kg/cm$^2$G and a rotational speed of 400 r.p.m. of a stirrer. When the vessel was examined after 1,000 hours of continuous polymerization, no adhesion was found in the upper three compartments in which wood was used as an aparatus material, and no adhesion was similarly formed on the surfaces of the coils. On the other hand, it was found that adhesion in the form of a thin film was formed on the surface portion made of stainless steel in the lower three compartments of the vessel, but that the adhering material had no adverse effect on the continuous polymerization.

We claim:

1. A suspension polymerization process which comprises polymerizing a member selected from the group consisting of ethylene halides and mixtures of an ethylene halide and a monomer copolymerizable therewith in an aqueous medium in the presence of a suspending agent and an oil-soluble catalyst under pressure in a pressure polymerization vessel the internal exposed surfaces of which are at least partially lined with wood thereby to prevent adhesion thereto of the resulting polymer.

2. The process according to claim 1 wherein the pressure polymerization vessel is provided with a cooling coil therein.

3. The process according to claim 2 wherein the pressure polymerization vessel is a single polymerization vessel which is divided into a plurality of compartments.

4. The process according to claim 2 wherein the pressure polymerization vessel comprises a plurality of single vessels connected to each other by pipes lined on the inner wall surface thereof with wood.

* * * * *